(12) United States Patent
Everard et al.

(10) Patent No.: US 11,752,634 B2
(45) Date of Patent: Sep. 12, 2023

(54) ROTATABLE FASTENER VERIFICATION

(71) Applicant: Illinois Tool Works Inc, Glenview, IL (US)

(72) Inventors: Stephen M. Everard, Lake Orion, MI (US); James T. Kirchen, Chippewa Falls, WI (US); Marc R. Risdale, Ontario (CA)

(73) Assignee: Illinois Tool Works Inc., Glenview, IL (US)

( * ) Notice: Subject to any disclaimer, the term of this patent is extended or adjusted under 35 U.S.C. 154(b) by 554 days.

(21) Appl. No.: 16/241,336

(22) Filed: Jan. 7, 2019

(65) Prior Publication Data

US 2019/0143526 A1  May 16, 2019

Related U.S. Application Data

(63) Continuation of application No. 14/443,077, filed as application No. PCT/US2013/075204 on Dec. 14, 2013, now abandoned.

(60) Provisional application No. 61/738,143, filed on Dec. 17, 2012.

(51) Int. Cl.
*B25J 9/16* (2006.01)
*B60R 21/213* (2011.01)
*F16B 21/02* (2006.01)
*G06V 20/52* (2022.01)

(52) U.S. Cl.
CPC ........... *B25J 9/1697* (2013.01); *B60R 21/213* (2013.01); *F16B 21/02* (2013.01); *G06V 20/52* (2022.01); *G05B 2219/37559* (2013.01)

(58) Field of Classification Search
CPC .. B25J 9/1697; G06K 9/00771; B60R 21/213; F16B 21/02; G05B 2219/37559
See application file for complete search history.

(56) References Cited

U.S. PATENT DOCUMENTS

| | | | |
|---|---|---|---|
| 1,803,431 A | 2/1930 | Hill | |
| 2,262,418 A | 12/1940 | Zahodiakin | |
| 4,262,394 A | 4/1981 | Wright | |
| 5,368,427 A | 11/1994 | Pfaffinger | |
| 5,765,959 A | 6/1998 | Shioda | |
| 6,267,543 B1 | 7/2001 | David et al. | |
| 6,338,649 B1 | 1/2002 | Smith | |
| 6,612,795 B2 | 9/2003 | Kirchen | |
| 6,769,853 B2 | 8/2004 | Perrot | |

(Continued)

FOREIGN PATENT DOCUMENTS

| | | |
|---|---|---|
| DE | 29812889 A1 | 10/1998 |
| DE | 102004025698 A1 | 12/2005 |

(Continued)

*Primary Examiner* — Nasim N Nirjhar
(74) *Attorney, Agent, or Firm* — Quarles & Brady LLP

(57) ABSTRACT

A system is disclosed for verification of the installation of a component such as a side curtain air bag into a vehicle passenger compartment where energy absorbing quarter-turn fasteners attached to the air bag are employed to affix hanger brackets to structural base plates in the vehicle. The system includes an image capturing camera, stored data in a machine readable form of an acceptable installation, a central processing unit to compare the captured images to the stored machine readable data and an output generator to create an output signal based on the results of the comparison.

17 Claims, 6 Drawing Sheets

(56) References Cited

U.S. PATENT DOCUMENTS

| | | |
|---|---|---|
| 6,988,863 B2 | 1/2006 | Hulin et al. |
| 7,677,598 B1 | 3/2010 | Ryan et al. |
| 8,474,111 B2 | 7/2013 | Ribes Marti |
| 9,062,696 B2 | 6/2015 | Demerath et al. |
| 2004/0021856 A1* | 2/2004 | Nishiyama ............ G01N 21/94 356/237.2 |
| 2004/0114135 A1* | 6/2004 | Edwards ................ G01M 11/02 356/239.2 |
| 2006/0285918 A1 | 12/2006 | Legat et al. |
| 2007/0009136 A1 | 1/2007 | Pawlenko |
| 2007/0158931 A1 | 7/2007 | Baumgartner et al. |
| 2010/0115887 A1 | 5/2010 | Schroeder |
| 2011/0026823 A1 | 2/2011 | Wu |
| 2011/0167731 A1 | 7/2011 | Zagromski |
| 2011/0211726 A1 | 9/2011 | Moed |
| 2012/0039687 A1* | 2/2012 | Ostergren ............... F16B 21/02 411/508 |
| 2012/0192388 A1 | 8/2012 | Demerath et al. |
| 2013/0054029 A1* | 2/2013 | Huang .................... B25J 5/005 700/259 |
| 2014/0017036 A1 | 1/2014 | Everard |
| 2014/0056663 A1 | 2/2014 | Fukumoto |
| 2014/0099015 A1* | 4/2014 | Adams ................. B60R 21/232 382/141 |

FOREIGN PATENT DOCUMENTS

| | | |
|---|---|---|
| DE | 102006052836 A1 | 5/2008 |
| DE | 102011009683 A1 | 8/2012 |
| EP | 1220592 A1 | 7/2002 |
| EP | 1978430 A1 | 10/2008 |
| WO | 0169726 A1 | 9/2001 |
| WO | 2010012422 A1 | 2/2010 |
| WO | 20100117322 A1 | 10/2010 |
| WO | 2012129471 A2 | 9/2012 |
| WO | 2012144157 A1 | 10/2012 |
| WO | WO-2013033442 A1 * 3/2013 ......... G06K 9/00771 |  |

\* cited by examiner

ROTATABLE FASTENER VERIFICATION

CROSS-REFERENCE TO RELATED APPLICATIONS

This application is a continuation of U.S. patent application Ser. No. 14/443,077, filed May 15, 2015, which is a National Phase of International Application No. PCT/US2013/075204, filed Dec. 14, 2013, which, in turn, claims priority to U.S. Provisional Application Serial No. 61/738,143, filed Dec. 17, 2012, all of which are hereby incorporated by reference in their entireties.

BACKGROUND

This disclosure relates to utilization of energy absorbing rotatable locking fasteners. More particularly, it relates to use of energy absorbing rotatable locking fasteners for installation of curtain air bags in vehicles and to a system for verification of the installation of such fasteners during an assembly process.

Rotatable, energy absorbing, fasteners have been successfully employed in assembly processes involving installation of accessory equipment. One known application is the installation of curtain airbags into automotive vehicles.

Typically a suitable fastener for securement of a curtain air bag is a unitary plastic and metal structure insertable through appropriately formed apertures in an air bag retention tab and a vehicular body plate and rotatable ninety degrees (90°) to secure the tab to the vehicle. The fastener includes energy absorbing structure that absorbs energy of air bag deployment to minimize potential damage to the vehicular components.

Such fasteners possess numerous desirable features that make them particularly suitable for use. The rotatable fastener is easily inserted into the airbag tab and similarly inserted into a base plate on the vehicle frame. It is easily rotated to lock it into position to secure the airbag tab to the frame. Moreover, current designs of quarter-turn fasteners incorporate energy absorbing characteristics which absorb the energy of airbag deployment and minimize structural damage to the vehicle frame.

One such fastener is disclosed in International Publication No. WO 2012/129471 A2 published Sep. 27, 2012 entitled "Verification Arrangement for Fastener System" the entire content of the specification and drawings of which are hereby incorporated by reference herein as if fully set forth.

While the fasteners described herein, and in the identified International Application, are particularly suited for assembly of curtain airbags into the frame of an automotive vehicle, it is contemplated that such fasteners, and consequently the systems of this disclosure have wide application in assembly processes involving installation of a component. Though described and illustrated in connection with vehicular assembly, the fastener and the verification system may be employed wherever the features of the fasteners provide a desirable advantage.

As disclosed in the above identified WO Publication No. 2012/129471, the use of quarter-turn fasteners as described for installation of curtain air bags renders the assembly process suitable to effective and efficient verification of satisfactory completion of the installation process. This capability is a desirable advantage to the OEM manufacturer and augments the desirability and usefulness of the quarter-turn fastener. The present disclosure provides an efficient and effective verification capability, using image capturing recognition, evaluation and acceptance of the assembly process employing the quarter-turn energy absorbing fastener.

DETAILED DESCRIPTION OF THE ILLUSTRATED EMBODIMENTS

Figure 6:
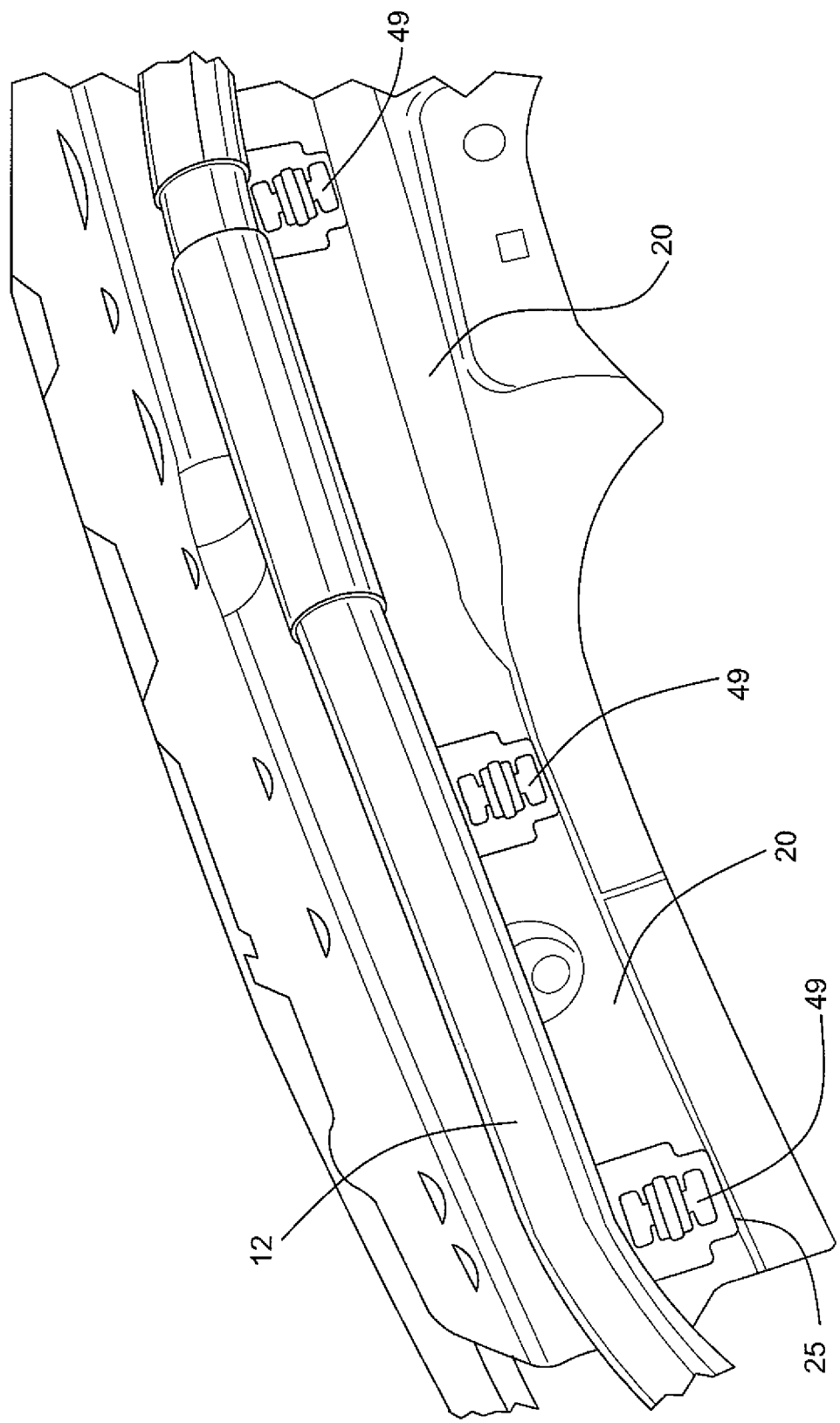
FIG. 6 illustrates a typical installation of a side curtain air bag into the interior of a vehicle employing energy absorbing quarter-turn fasteners.

FIG. 6 is illustrative of the installation of a side curtain air bag in an automotive vehicle. The curtain air bag assembly 10 includes a rolled inflatable fabric 12 supported by a plurality of hanger brackets 25 affixed in spaced intervals to the air bag fabric 12 and secured in spaced intervals to a vehicular base plate 20 within the vehicle passenger compartment. An energy absorbing, quarter-turn fastener 49 secures each hanger to base plate 20. In FIG. 6, three fastener hanger bracket connections are shown. However, each side curtain air bag installation may include as many such connections of the curtain air bag to the vehicle interior structure as necessary to support it within the vehicle.

In the attachment arrangement of the present disclosure, hanger brackets 25 are steel structural members. Energy absorbing rotatable fasteners are employed to affix the hanger brackets 25 in spaced intervals to the base plate 20, which is also a steel structural member, integrated to the vehicle body. Notably, the vehicular base plate 20 is shown as a single panel to which all hanger brackets are connected. It is contemplated that separate base plates 20 may be utilized for the hanger bracket-fastener combinations.

Figure 1:
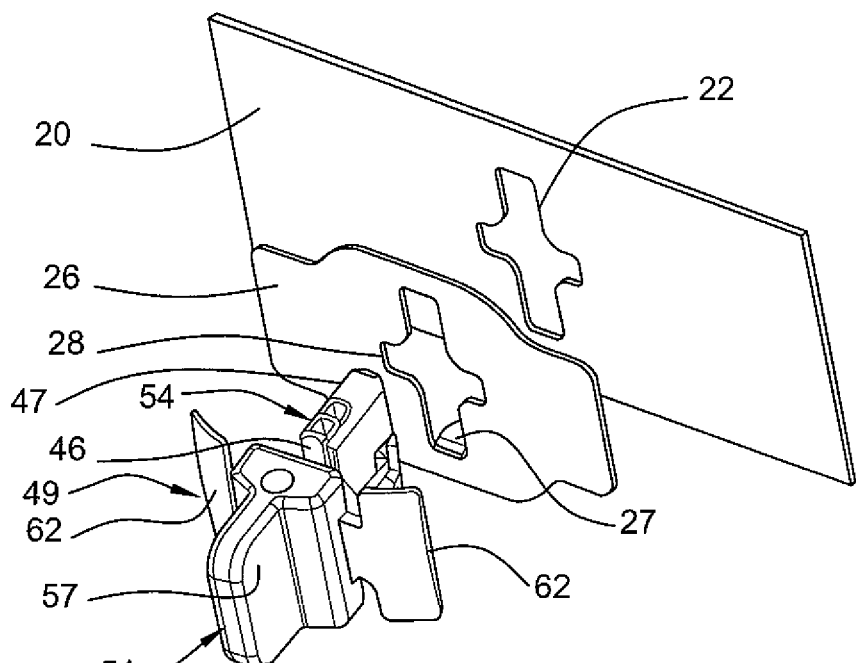
FIG. 1 is an exploded perspective view of an energy absorbing rotatable fastener employed in attachment of a component to a base plate.

FIG. 1 shows a hanger bracket 25, a base plate 20, and a rotatable energy absorbing fastener 49. As illustrated, hanger bracket 25 includes a cruciform shaped hole 28 having a long slot and a short slot sized to receive an inserted portion of the fastener 49. Notably the hole 28 includes a tab 27 extending inward, in the direction of fastener insertion, at the opposite ends of the long slot of the cruciform shape.

Figure 4:
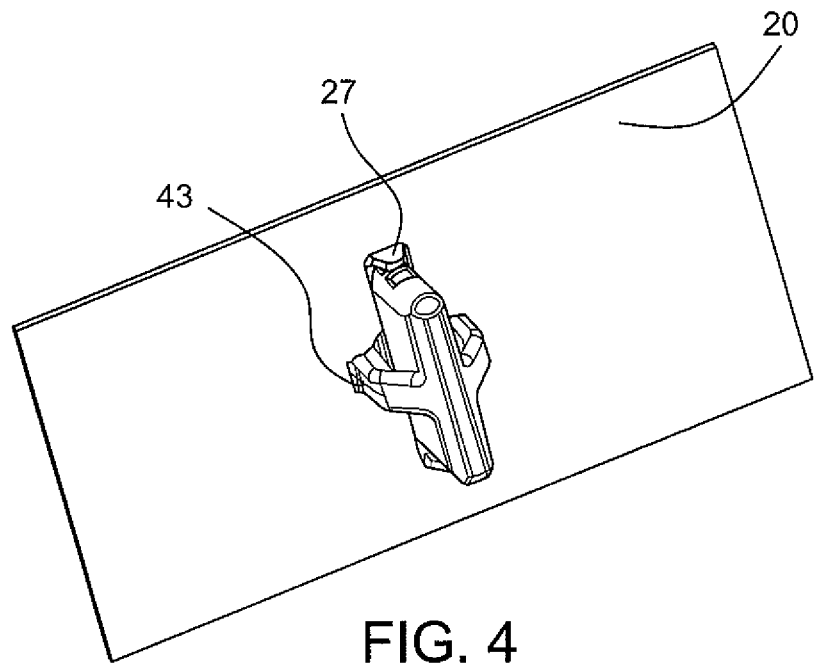
FIG. 4 is a rear perspective view of the base plate of FIG. 1 to which a component is being attached employing the fastener of FIG. 1 with the fastener in its initial insertion position.
Figure 5:
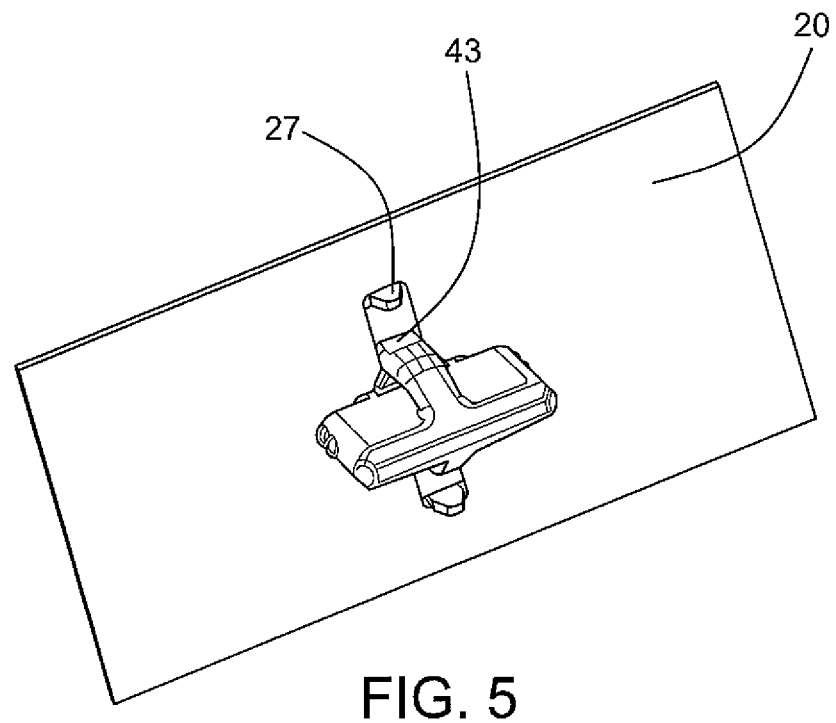
FIG. 5 is a rear perspective view of the base plate of FIG. 1 to which a component is being attached employing the fastener of FIG. 1 with the fastener in its rotated and locked, energy absorbing position.

The base plate 20 includes complimentary cruciform shaped hanger receptacle or hole 22 having an intersecting long slot and short slot to similarly receive the inserted portion of the fastener 49. Importantly, as best seen in FIGS. 4 and 5, the distal ends of the long slot of hole 22 are shaped to receive the tabs 27 of the hanger bracket 25 on attachment of the hanger by the fastener 49. The engagement of tabs 27 fix the hanger bracket 25 against rotation relative to base plate 20.

FIGS. 1 to 5 show an exemplary rotatable, energy absorbing fastener, generally referred to as a quarter-turn fastener, illustrated to secure a side curtain airbag to the roof rail of an automotive vehicle. This illustrated use is exemplary and not limiting. For example, the fastener can rotate more or less than ninety degrees as desired.

It should be understood that throughout this specification reference to "horizontal" and "vertical" is for clarity of description of the illustrations and not limitation. That is, fastener components could be oriented in any angular disposition relative to a longitudinal or vertical plane and the fastener configured and positioned accordingly. Also, longitudinally means along a line in the direction of insertion, transverse means perpendicular to that line. Forward or front, and rearward or back, is in reference to the direction of insertion of the fastener 49 into the receiving apertures 22 and 28. In this regard, front or forward is visible to the user or viewer and back or rearward is concealed.

Fastener 49 is configured to attach hanger bracket 25 to base plate 20 by insertion of a portion of the fastener through hole 28 in hanger bracket 25 and through hole 22 in base plate 20 followed by rotation of fastener 49 to a locked or secured position. When so positioned, the fastener securely affixes the hanger bracket 25 to base plate 20 and additionally provides energy absorbing capability to dissipate energy of airbag deployment.

Figure 2:
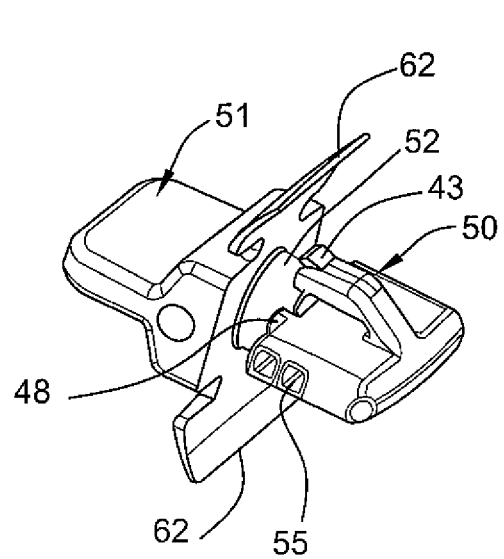
FIG. 2 is a rear perspective view of the fastener of FIG. 1.
Figure 3:
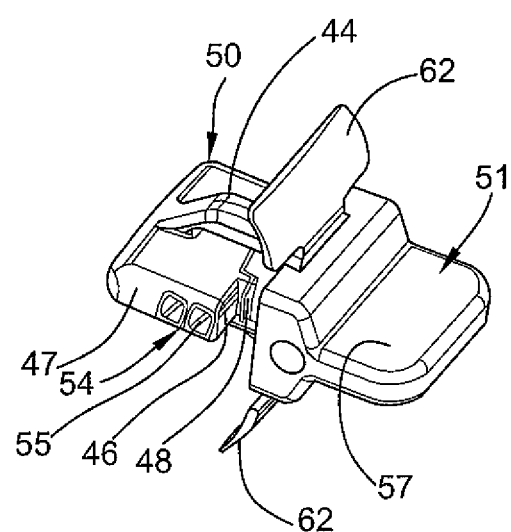
FIG. 3 is a front perspective view of the fastener of FIG. 1.

Seen in FIGS. 1 to 3, fastener 49 has a body elongate along an axis in the direction of insertion comprising a rear attachment portion 50 and a forward head portion 51 joined by a central shaft portion 52.

The head portion 51 defines an elongate grip 57 for manual manipulation. Radial wings 62 extend laterally from head portion 51. The wings 62 are configured to extend in the direction of insertion and upon contact with the front surface of hanger 27 deform to act as cantilever leaf springs to urge the fastener outward in the direction opposite the direction of insertion.

The attachment portion 50 is cruciform shaped and includes long bars 47 and short bars 44. The long bars include planar abutment surfaces 46 arranged to contact the rear surface of base plate 20 when fastener 49 is in the locked position. The long bars 47 comprise energy absorbing structure 54. Each bar 47 includes a series of voids 55 along its exterior edge which contribute to its energy absorbing characteristics. Each abutment surface 46 of long bar 47 includes a rearwardly directed lug 48 at its transversely inward end.

The short bars 44 include flexible fingers 43 best seen in FIGS. 2, 4 and 5 extending toward head portion 51. The fingers 43 are spaced apart a distance somewhat longer than the length of the short slot of the cruciform hole 28 in hanger bracket 25. The outermost edges of the fingers 43 may be tapered to converge in the direction of insertion to assist in passage through the short slot of hole 28 in hanger bracket 25.

On insertion of the attachment portion 50 into the hole 28, the flexible fingers 43 are deformed toward each other to pass through the short slot. The fingers 43 surpass the hole 28 and spring laterally outward behind the rear surface of hanger bracket 25. At that position, the wings 62 are in contact with the front surface of the hanger bracket 25 and deformed sufficiently to urge the fastener 49 in the direction opposite the direction of insertion.

The fingers 43 abut the rear surface of hanger bracket 25 and retain the fastener on hanger bracket 25. Importantly, the fastener 49 and hanger bracket 25 may be preassembled by the manufacturer of the airbag for later installation into a vehicle by the vehicle manufacturer.

The fastener 49 includes a rigid core that extends between head portion 51 and attachment portion 50. The shell or cover surrounding the core is made of an energy absorbing material.

Installation of the curtain airbag assembly 10 into a vehicle is accomplished by insertion of fastener 49 on each hanger bracket 25 into a fastener receptacle hole 22 in a plate 20. The fastener 49 is inserted against the opposing force of wings 62 sufficiently for abutment surfaces 46 including rearward lugs 48 of long bars 47 to surpass the rear surface of base plate 20. The fastener 49 is rotated, such as by ninety degrees (90°) or one-quarter-turn, to align the short bars 44 with the long slots in base plate 20. On release of fastener 49, the restoring force imparted by the deformed wings 62 causes the short bars 44 to lodge within the long slots of base plate 20 arresting rotation of the fastener in its locked position. Also, the lugs 48 engage within the short slots of cruciform shaped aperture 22 of base plate 20 to further insure retention of the fastener 49 in its rotated, locked position with the energy absorbing bars 47 positioned behind the rear surface of base plate 20. In this position, the abutment surfaces 46 of long bars 47 are positioned against the rear surface of base plate 20 placing the energy absorbing structure of bars 54 in operative position.

Assurance that the fasteners employed to attach a component such as the curtain air bag hanger bracket to a vehicle base plate are properly inserted, and rotated to a locked, energy absorbing position, is an important aspect of this disclosure. In this regard, a verification system is illustrated in the present disclosure that employs an image capturing camera in conjunction with a central processing unit, connected to comparison data in the form of a machine readable medium to confirm complete insertion of each fastener and placement into the locked, energy absorbing position. The system, of course, could be employed to verify the installation, utilizing energy absorbing rotatable fasteners, of any form of component.

Figure 7:
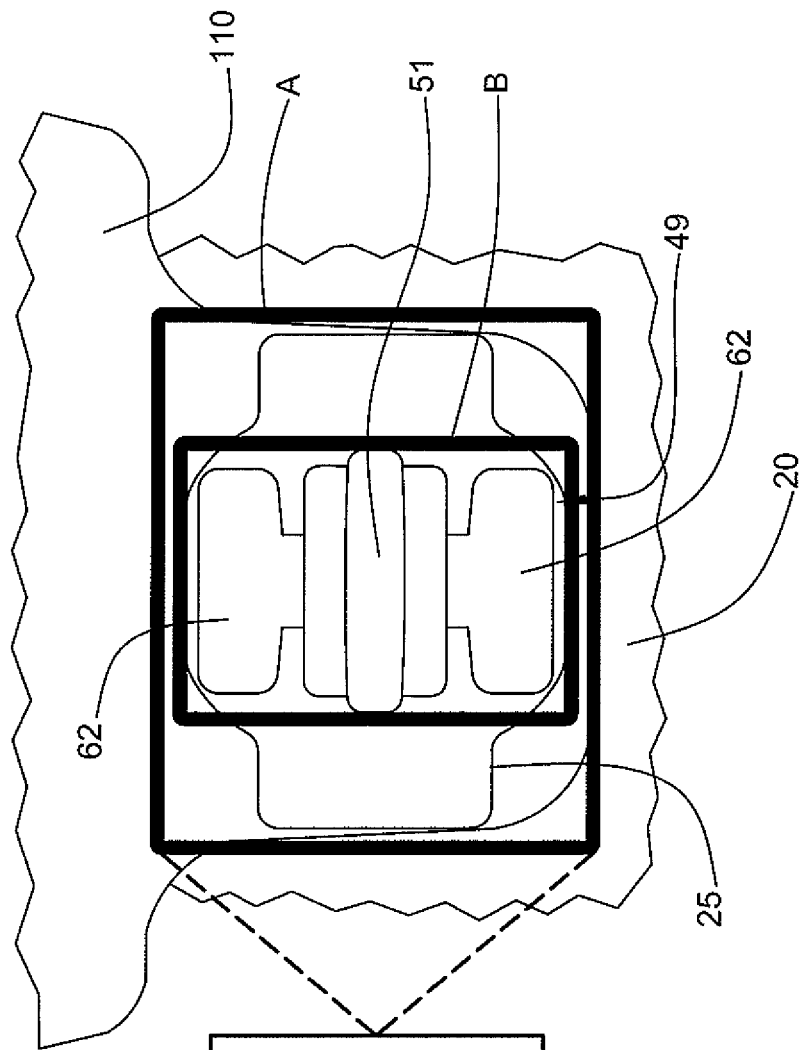
FIG. 7 is a schematic of the verification system of the present disclosure utilizing machine vision to verify installation and proper completion of the assembly process using quarter-turn fasteners.
Figure 7:
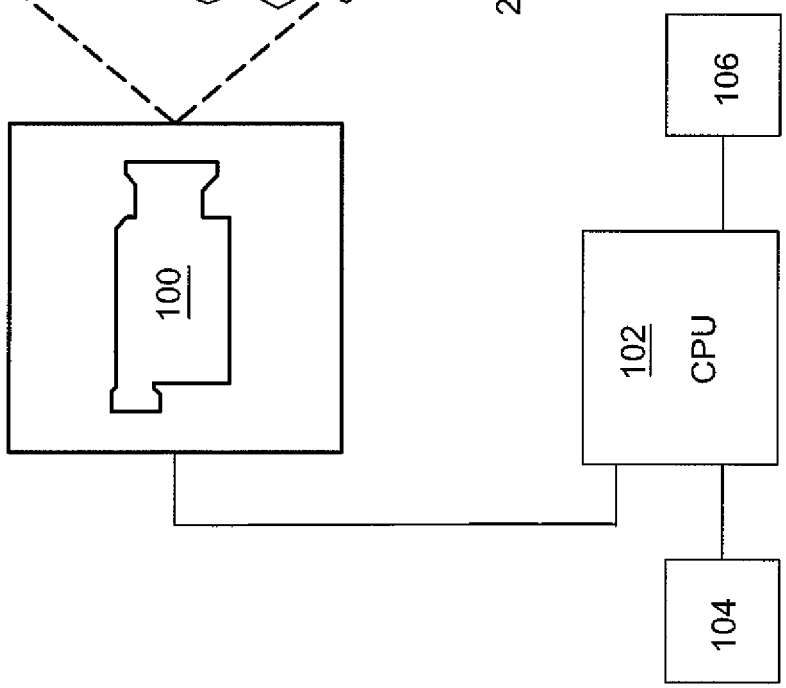

Referring to FIG. 7, the equipment of the disclosed system includes one or more image capturing digital cameras 100, a central processing unit 102, data stored in a machine readable medium 104, and an output device 106. The system operates to compare image data received from the camera 100 with stored data of an image or images of an acceptable configuration within the machine readable medium 104. The central processing unit 102 compares one or more images of the configuration of the viewed installation captured by the image capturing camera 100 with the stored image or images in the stored data of the machine readable medium 104 to determine the condition of the installation being viewed. In the event of a negative determination, the central processing unit activates the output device 106. The output device 106 may signal a failure, or may take an action, such as to temporarily terminate the assembly process, or any other desired action. In the event of a positive determination the output device may provide any suitable acceptance signal.

The word "image" or "images" is used to refer to the data recorded by camera 100. It could comprise a single view of the entire installation, or it could include separately identifiable elements, such as the hanger bracket 25 or fastener 49, or any combination of the elements of the installation.

The system works by first taking one or more pictures of a known "good" assembly and using that as the basis to digitally compare assemblies in production for verification. This baseline data, stored in a machine readable medium 104 could include the presence, position and location of the fastener 49 and hanger bracket 25 as assembled to base plate 20. In this regard the camera 100 may capture separate images, for example, of the hanger bracket 25 (Image A, FIG. 7) or fastener 49 (Image B, FIG. 7) to make the requisite comparisons to the stored data of the machine readable medium 104 and supply separate images to the central processing unit. Alternatively, the captured image may include the entire installation.

During verification, the central processing unit compares distinct features of the assembled components received from camera 100 to the stored data base of an acceptable, "good" assembly to assess the condition of the viewed assembly. Recognition of completion of a proper installation results in an appropriate output signal. Similarly, recognition of a flawed installation results in an appropriate output signal denoting a failure.

FIG. 7 shows fully inserted fastener 49 rotated to its locked energy absorbing position attaching a hanger bracket 25 to a base plate 20. In this position, the grip 57 extends horizontally and the wings 62 are disposed transversely on either side vertically of the grip.

A sensor in the form of an image capturing camera 100 is shown schematically in FIG. 7. It is utilized to view the fastener 49 and environment including the fastener 49, hanger bracket 25 and base plate 20. Camera 100 captures the image then stored in the form of machine readable data in a machine readable medium 104 for processing by the central processing unit 102. It may view the hanger bracket 25, fastener 49 separately as image A and image B, or collectively as a single image.

Figure 8:
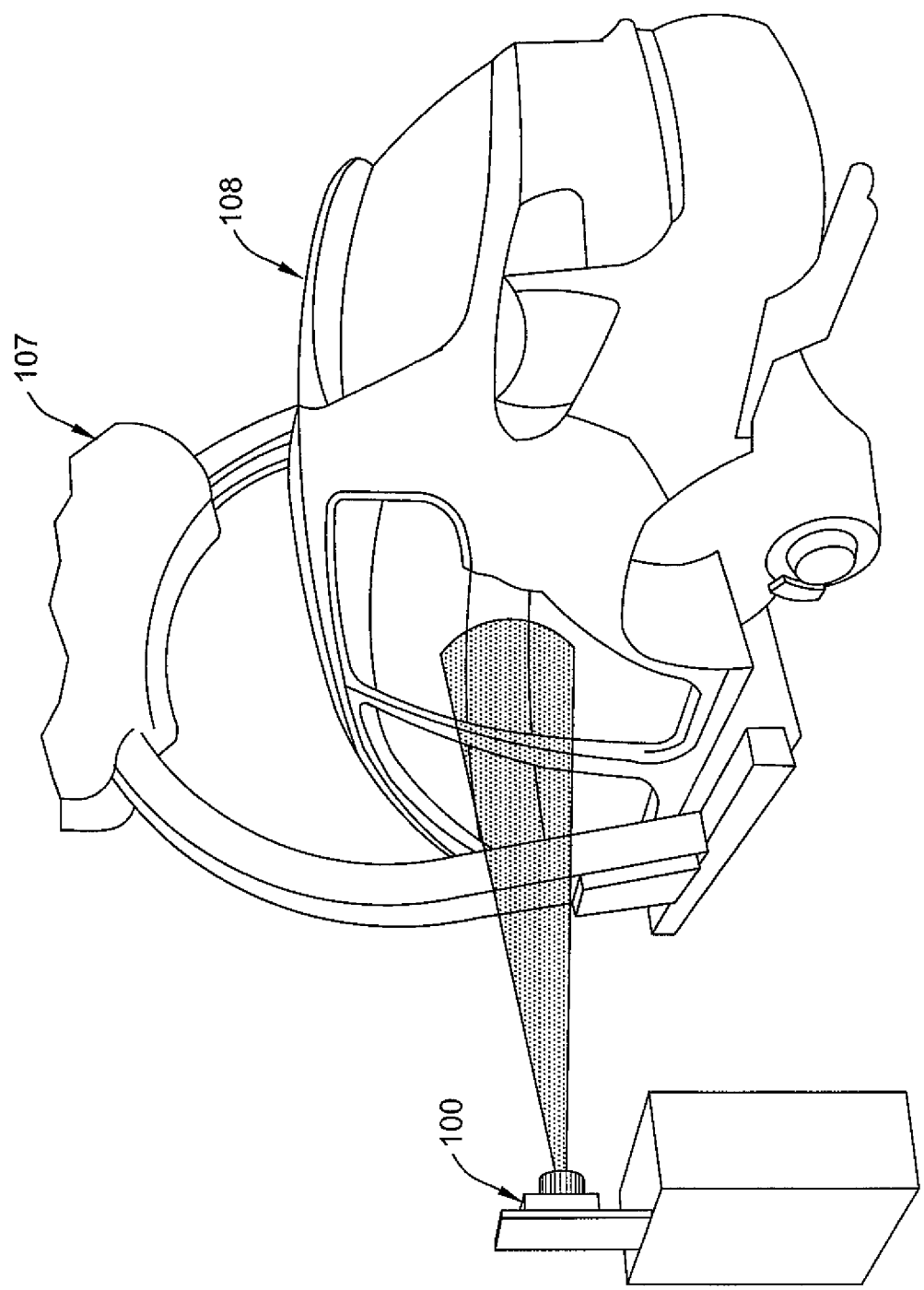
FIG. 8 illustrates an assembly verification system in accordance with the present disclosure utilizing fixed position camera arrangement.

The central processing unit makes a comparison of the images received with a stored image of an acceptable installation. On recognition of a completed assembly, as illustrate in FIG. 8, the central processing unit will acknowledge a complete and satisfactory installation (PASS). For example, the image sensing camera 100 will check for the presence of hanger bracket 25 and the presence and orientation of fastener 49. If the condition illustrated in FIG. 7 is present, the system will accept the installation.

The chart below is illustrative of some of the capabilities of the verification system. It identifies various conditions of the installation that may be recognized by the image capturing camera 100 and indicates the resultant output signal from the output device 106.

| Condition Recognized | Result |
| --- | --- |
| Fastener missing | Fail |
| Hanger missing | Fail |
| Fastener not fully installed in hanger | Fail |
| Fastener turned in hanger | Fail |
| Fastener not fully pushed in vehicle | Fail |
| Fastener not turned in vehicle | Fail |
| Fastener only partially turned in vehicle | Fail |
| Fastener turned too far in vehicle | Fail |
| Fastener missing from curtain | Fail |
| Hanger missing (not installed) | Fail |

-continued

| Condition Recognized | Result |
| --- | --- |
| Fastener not fully installed in hanger | Fail |
| Fastener turned in hanger prior to assembly to body | Fail |
| Fastener turned in hanger (as above) but operator tries to align fastener and curtain to body hole by rotating whole curtain assembly | Fail |

In using the system of the present disclosure, it is contemplated that a vision system image capturing camera 100 may be placed, for example, at a verification station adjacent an automotive assembly line designated 107 carrying advancing, partly assembled vehicles 108. In this exemplary arrangement, an image capturing camera 100 is located at a fixed station adjacent the advancing vehicles. Camera 100 is arranged to view, for example, the interior of the vehicle at the location illustrated in FIG. 6, the location of the area above the window openings where installation of a component, illustrated as side curtain air bag 10 has been made using energy absorbing quarter-turn fasteners 49. As a vehicle advances, camera 100 gathers information through image capture for comparison to data representative of a proper installation stored in the machine readable medium 104, including the presence of, and relative positions of, the fastener 49 and hanger brackets 25.

The stored data can also include information concerning the number of fasteners 49 representing a complete installation. On such comparison, the central processing unit will provide a "pass" signal, or in instances of some form of recognized anomaly indicate a "fail" signal. The output device may also initiate action to temporarily pause the assembly process.

As an alternative, it is also contemplated that an image capturing camera 100 could be mounted on a robotic arm for insertion and inspection of the interior of each vehicle being assembled as it passes the verification station.

Vision recognition hardware and software is commercially available. Once source contemplated for supply of equipment useful in carrying out the verification process disclosed herein is Cognex Corporation, Plymouth, Mich.

Figure 9:
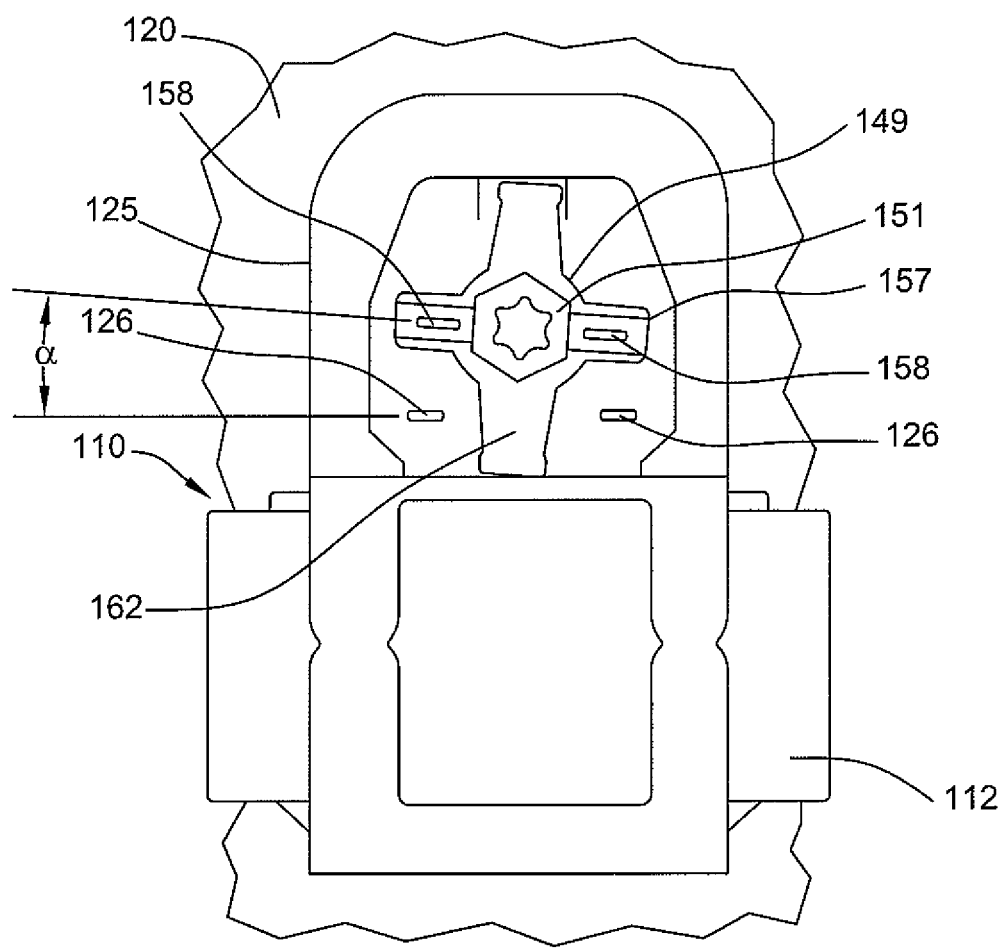
FIG. 9 illustrates a modification to the structure of the components of the installation to augment verification capabilities.

Another variation on the capability of component installation verification utilizing image capture is illustrated in FIG. 9. Here there is disclosed an installation of a curtain air bag assembly 110 supported upon a hanger bracket 125 utilizing an energy absorbing fastener 149 having the functional elements as described in connection with FIGS. 1 to 5. The installation to be verified includes a curtain air bag assembly 110, in which a plurality of hanger brackets 125 support a rolled air bag fabric 112.

As illustrated in FIG. 9, energy absorbing rotatable fastener 149 secures the hanger bracket 125 to the vehicle at base plate 120. It is contemplated that the hanger bracket 125 and base plate 120 include cruciform shaped slots such as the slots 28 and 20 described in connection with the installation illustrated in FIGS. 1 to 5. Hanger bracket 125 includes reference indicia comprising a pair of generally horizontally elongate slots 126, one on either side of the center slot in the center of the hanger bracket (as in FIG. 1). Alternatively, slots 126 may comprise upstanding horizontally elongate protrusions.

Fastener 149 is configured essentially the same as the fastener 49 of FIGS. 1 to 5. It includes a forward head portion 151 shaped somewhat differently than the forward head portion of the fastener 49 of the earlier embodiment. In all other respects, it is structurally and functionally the same as fastener 49. Head portion includes a central knob with diametrically opposed grips 157 and diametrically opposed cantilevered wings 162.

Each fastener 149 includes a reference indicia comprising a horizontally elongate projection 158 on each grip 157. The projections 158 could, however, optionally be depressions, or scribed lines.

As illustrated in FIG. 9, when the fastener 149 is inserted into hanger bracket 125 and base plate 120 and rotated ninety degrees (90°) to its locked energy absorbing position the elongate projections 158 are aligned generally parallel to the elongate slots or protrusions 126 on hanger bracket 125.

As previously described in connection with the embodiment of FIGS. 1 to 5, when fastener 149 is in its locked energy absorbing position various structural elements prevent rotation from that position. Thus, when properly installed, the fastener 149 may rotate relative to hanger bracket 125 no more than four to six degrees (4° to 6°) angularly in either a clockwise or counter-clockwise direction. That is, a projection 158 on a grip 157 may converge toward, or diverge away from a slot or protrusion 126 on hanger bracket 125 by from four to six degrees (4° to 6°). Such rotation, could be recognized as a variance of the angular relationship, designated alpha (a) in FIG. 9, of projections 158 and slots 126.

The installation verification system disclosed is readily adapted to recognition of the relationship between the lines or projections 158 formed on the grips 157 and the slots or protrusions 126 formed on hangar bracket 125.

Referring to FIG. 6, in the alternative system contemplated here, camera 100 is arranged to capture the image of the fastener 149 and hanger bracket 125 including the relationship of the angular position of the lines or projections 158 to the holes or protrusions 126. The data stored within the machine readable medium 104 includes the information definitive of the limits of relative angular variance between the projections 158 and slots or slots 126 in a properly locked fastener 149. On comparison of the captured images to the stored data, central processing unit 102 provides an output "pass" signal if the captured image shows that relationship between the acceptable limits. Should the angular relationship exceed the permissible movement of a locked fastener 149, relative to its associated hanger 125, the central processing unit would activate a "fail" signal from output device 106.

It is also contemplated that the image capturing system illustrated in FIG. 6 could be arranged to perceive, and take action based on the distance in the direction of insertion, for example from the outer surface of fastener 149 to the vehicle body plate 120. An acceptable distance relationship would be stored in the comparison data of machine readable medium 104 between those surfaces representative of a properly attached installation.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A verification system for verifying installation of a component including at least a hanger bracket and a rotatable fastener, the hanger bracket comprising first reference indicia including a pair of horizontally elongate slots on either side of a center slot in the center of the hanger bracket, and the rotatable fastener comprising a second reference indicia including a horizontally elongate projection on a grip, the verification system comprising:
    an image capturing camera that captures one or more images of the component as component image data;
    a non-transitory machine readable medium that stores acceptable component configuration data, wherein the acceptable component configuration data represents an acceptable installation of the component;
    a central processing unit in communication with the non-transitory machine readable medium, wherein the central processing unit receives the component image data and compares the component image data with the acceptable component configuration data to determine an installation condition of the component; and
    an output device coupled to the central processing unit, wherein the central processing unit activates the output device, in response to the installation condition of the component being unacceptable, to one or both of signal an installation failure and take an action to temporarily terminate an assembly process, and wherein the central processing unit activates the output device, in response to the installation condition of the component being acceptable, to signal a satisfactory installation;
    wherein the acceptable component configuration data includes an acceptable variance of an angular relationship corresponding to the position of the pair of horizontally elongate slots of the hanger bracket relative to the position of the horizontally elongate projection of the rotatable fastener; and
    wherein an unacceptable installation condition of the component includes the angular relationship exceeding the acceptable variance.

2. The verification system of claim 1, wherein the one or more images comprise an entirety of the component in relation to a structure.

3. The verification system of claim 1, wherein the one or more images comprise separately identifiable elements of the component.

4. The verification system of claim 3, wherein the separately identifiable elements comprise the hanger bracket, the rotatable fastener, and a base plate.

5. The verification system of claim 1, wherein the pair of horizontally elongate slots of the hanger bracket are aligned parallel to the horizontally elongation projection of the rotatable fastener when the rotatable fastener is inserted into the hanger bracket and a base plate and rotated ninety degrees to a locked energy absorbing position.

6. The verification system of claim 4, wherein the installation condition of the component being unacceptable as determined by the central processing unit further comprises one or more of:
    the rotatable fastener missing;
    the hanger bracket missing;
    the rotatable fastener not fully installed in the hanger bracket;
    the rotatable fastener turned in the hanger bracket;
    the rotatable fastener not fully pushed in vehicle;
    the rotatable fastener only partially turned in the vehicle; and
    the rotatable fastener missing from a curtain.

7. The verification system of claim 1, wherein the image capturing camera initially captures one or more images of the hanger bracket and rotatable fastener in an acceptable installation condition as the acceptable component configuration data.

8. The verification system of claim 1, wherein the acceptable component configuration data further comprises presence, position, and location of a fastener and hanger bracket as assembled to a base plate.

9. The verification system of claim 1, wherein the image capturing camera is located at a fixed station adjacent one or more advancing vehicles.

10. The verification system of claim 1, wherein the image capturing camera is arranged to view an interior of one or more vehicles.

11. The verification system of claim 1, wherein the image capturing camera is mounted on a robotic arm for insertion and inspection of an interior of a vehicle being assembled.

12. A verification method for verifying installation of a component including at least a hanger bracket and a rotatable fastener, the hanger bracket comprising first reference indicia including a pair of horizontally elongate slots on either side of a center slot in the center of the hanger bracket, and the rotatable fastener comprising a second reference indicia including a horizontally elongate projection on a grip, the verification method comprising:
    capturing, by an image capturing camera, one or more images of the component as component image data;
    storing, by a non-transitory machine readable medium, acceptable component configuration data,
    wherein the acceptable component configuration data represents an acceptable installation of the component;
    coupling a central processing unit with the non-transitory machine readable medium;
    receiving, by the central processing unit, the component image data;
    comparing, by the central processing unit , the component image data with the acceptable component configuration data to determine an installation condition of the component;
    coupling an output device to the central processing unit;
    activating, by the central processing unit, the output device in response to the installation condition of the component being unacceptable to one or both of signal an installation failure or take an action to temporarily terminate an assembly process; and
    activating, by the central processing unit, the output device in response to the installation condition of the component being acceptable to signal a satisfactory installation;
    wherein the acceptable component configuration data includes an acceptable variance of an angular relationship corresponding to the position of the pair of horizontally elongate slots of the hanger bracket relative to the position of the horizontally elongate projection of the rotatable fastener; and
    wherein an unacceptable installation condition of the component includes the angular relationship exceeding the acceptable variance.

13. The verification method of claim 12, wherein the component comprises a hanger bracket, a base plate, and a rotatable fastener.

14. The verification method of claim 12, wherein the pair of horizontally elongate slots of the hanger bracket are aligned parallel to the horizontally elongation projection of the rotatable fastener when the rotatable fastener is inserted into the hanger bracket and a base plate and rotated ninety degrees to a locked energy absorbing position.

15. The verification method of claim 12, wherein the comparing comprises determining, by the central processing unit, that the installation condition of the component is unacceptable in response to one or more of:
    the rotatable fastener missing;
    the hanger bracket missing;
    the rotatable fastener not fully installed in the hanger bracket;
    the rotatable fastener turned in the hanger bracket;
    the rotatable fastener not fully pushed in vehicle;
    the rotatable fastener only partially turned in the vehicle; and
    the rotatable fastener missing from a curtain.

16. A verification system for verifying installation of a component including a hanger bracket, a base plate, and a rotatable fastener,
    wherein the hanger bracket comprises first reference indicia including a pair of horizontally elongate slots on either side of a center slot in the center of the hanger bracket,
    wherein the rotatable fastener comprises a second reference indicia including a horizontally elongate projection on a grip,
    wherein the pair of horizontally elongate slots of the hanger bracket are aligned parallel to the horizontally elongation projection of the rotatable fastener when the rotatable fastener is inserted into the hanger bracket and the base plate and rotated ninety degrees to a locked energy absorbing position,
    the verification system comprising:
    an image capturing camera that captures one or more images of the component as
    component image data, and wherein the image capturing camera initially captures one or more images of a known component in an acceptable installation condition as acceptable component configuration data, wherein the acceptable component configuration data represents an acceptable installation of the component;
    a non-transitory machine readable medium that stores the acceptable component configuration data;
    a central processing unit in communication with the non-transitory machine readable medium, wherein the central processing unit receives the component image data and compares the component image data with the acceptable component configuration data to determine an installation condition of the component, wherein the acceptable component configuration data comprises presence, position, and location of the fastener and the hanger bracket as assembled to the base plate; and
    an output device coupled to the central processing unit, wherein the central processing unit activates the output device in response to the installation condition of the component being unacceptable to one or both of signal an installation failure or take an action to temporarily terminate an assembly process, and wherein the central processing unit activates the output device in response to the installation condition of the component being acceptable to signal a satisfactory installation,
    wherein the installation condition of the component being unacceptable as determined by the central processing unit comprises one or more of:
    the rotatable fastener missing;
    the hanger bracket missing;
    the rotatable fastener not fully installed in the hanger bracket;

the rotatable fastener turned in the hanger bracket;
the rotatable fastener not fully pushed in vehicle;
the rotatable fastener only partially turned in the vehicle; and
the rotatable fastener missing from a curtain.

17. The verification system of claim 1, wherein the acceptable variance is 4 to 6 degrees.

\* \* \* \* \*